United States Patent [19]

Shinada et al.

[11] Patent Number: 4,463,129

[45] Date of Patent: Jul. 31, 1984

[54] PROCESS FOR IMPROVING ADHESION OF RUBBERY POLYMERS BY REACTING WITH SILANES IN TWO STAGES

[75] Inventors: Yasukavu Shinada, Yokohama, Japan; Daniel E. Nerinckx, Tubize, Belgium

[73] Assignee: Toa Nenryo Kogyo Kabushiki Kaisha, Tokyo, Japan

[21] Appl. No.: 323,760

[22] Filed: Nov. 23, 1981

[30] Foreign Application Priority Data

Nov. 25, 1980 [GB] United Kingdom ............... 8037803

[51] Int. Cl.$^3$ .................... C08F 255/06; C08L 9/00; C08L 23/16
[52] U.S. Cl. ...................................... 525/63; 525/65; 525/101; 525/105; 525/106; 525/102; 525/120; 525/121; 525/122
[58] Field of Search ............... 525/65, 101, 105, 106, 525/63

[56] References Cited

U.S. PATENT DOCUMENTS

| | | | |
|---|---|---|---|
| 3,366,612 | 1/1968 | Baldwin et al. | 525/102 |
| 3,666,539 | 5/1972 | Kiel | 525/101 |
| 3,850,872 | 11/1974 | Marzocchi | 523/213 |
| 3,998,985 | 12/1976 | Kitaj | 525/101 |
| 4,014,835 | 3/1977 | McCombs | 525/101 |
| 4,073,776 | 2/1978 | Galkiewicz et al. | 525/507 |
| 4,073,826 | 2/1978 | Galkiewicz et al. | 525/120 |

FOREIGN PATENT DOCUMENTS

| | | | |
|---|---|---|---|
| 738025 | 7/1966 | Canada | 525/101 |
| 53-1233 | 1/1978 | Japan | 525/101 |

*Primary Examiner*—Wilbert J. Briggs, Sr.
*Attorney, Agent, or Firm*—H. L. Cohen

[57] ABSTRACT

Rubbery polymer compositions, e.g. based on chlorobutyl rubber, having improved adhesion to mineral substrates such as glass or metal, are produced by a stepwise reaction sequence. In a first stage the rubbery polymer is reacted with a reactive silane such as an amino trialkoxy silane, in a second stage the product is mixed with an epoxy resin, and in a third stage a further amount of reactive silane is reacted with the epoxy containing compound.

12 Claims, No Drawings

PROCESS FOR IMPROVING ADHESION OF RUBBERY POLYMERS BY REACTING WITH SILANES IN TWO STAGES

The present invention relates to a process for producing rubbery polymer compositions, particularly but not exclusively those based on butyl polymers, which have improved adhesion to mineral substrates such as glass and metals. In particular the invention relates to product compositions which may be used as sealants in double glazing. Currently sulphonated rubbers are generally supplied as solutions which need drying and furthermore they tend to be decomposed by moisture which can come from condensation. Thus it is desirable to provide an adhesive or sealant composition that can be applied by extrusion and which has improved resistance to moisture.

It is well known that it is difficult to achieve good adhesion between mineral substrates such as glass and metals, and rubbery polymers such as butyl polymers including halobutyl polymers such as chlorobutyl rubber and bromobutyl rubber. Some commercial adhesives are available for bonding butyl polymers to substrates, but these have been found to be unsuitable for certain applications. For example, U.S. Pat. No. 3,366,612 relates to the rendering of halogen containing polymers such as chlorinated butyl rubber adhesive to substrates such as glass or metal by reacting them with a silane. It has been found that although this method improves the adhesion, it does not result in adequate adhesion for certain applications. In accordance with U.S. Pat. Nos. 4,073,776 and 4,073,826, the reaction products of novolac resins with various epoxides are used as tackifiers for elastomers such as chlorobutyl, however there is no suggestion also to use silanes in such compositions.

It has been proposed to use combinations of amino silanes with epoxy compounds as adhesion promoters in a variety of systems. For example U.S. Pat. No. 3,850,872 relates to the use of epoxy compounds and resins, along with amino silanes, to improve glass fibre-elastomer adhesion. In particular in this patent document the elastomer is blended with an oily epoxy compound and then compounded with silane treated glass fibres.

The previously proposed techniques for improving the adhesion between rubbers and mineral substrates have proved unsatisfactory where it is particularly important that the bond be water resistant such as with butyl sealants for double glazing.

We have now found that significantly improved adhesion may be achieved if a rubbery polymer such as a halobutyl rubber is subjected to a stepwise reaction sequence in which it is first reacted with a silane, the silane containing rubber is subsequently mixed with an epoxy resin, and this product then reacted with further silane.

Accordingly the present invention provides a process for producing a composition having improved adhesion to mineral substrates characterized in that it comprises in a first stage reacting a rubbery polymer with a reactive silane (as hereinafter defined) at elevated temperature; in a second stage mixing the product of the first stage with an epoxy resin as wetting agent; and in a third stage reacting the epoxy containing product of the second stage with a further amount of a reactive silane (as hereinafter defined) to form the desired composition.

The scope of the invention, it will be appreciated, also extends to the compositions produced by the defined process, and to their use as a mastic or a component of a mastic. Moreover the invention includes glazing systems which incorporate such compositions or mastics as sealants.

The term reactive silane as used herein is meant to include silanes having a first group attached directly or indirectly to the silicon atom which is reactable with the rubbery polymer, and at least one other group attached directly or indirectly to the silicon atom which is hydrolysable and which, on hydrolysis in contact with the surface of a mineral substrate such as glass, concrete or metal will give a strong bond thereto.

The reactive silane used in the first reaction stage is preferably the same as that used in the third stage, although they may be different if required. The silane may be for example a mercapto-, epoxy- or vinyl-silane in which the specified functional groups react with the rubbery polymer, in the presence of free radical initiator if necessary.

However, it is particularly preferred that the reactive silane used is an amino silane such as the commercially available product Z-6020, N-beta-(aminoethyl) gamma-amino propyl trimethoxy silane.

The amount of reactive silane used in the first stage of the process is preferably from 50 to 100%, more preferably from 60 to 75% of that stoichometrically required to combine with the rubbery polymer. For example some two thirds of the stoichometric amount may be used in order to avoid the reticulation which could take place under certain conditions if the stoichiometric amount or more is employed.

The rubbery polymer used in accordance with the invention may be for example EPR, EPDM or an EVA copolymer. However the process has been found to be particularly useful when the rubbery polymer is a halobutyl rubber such as chlorobutyl rubber. Bromobutyl rubbers may also be employed, but they generally tend to be too reactive for convenience.

In the case where the reactive silane is an amino silane and the rubbery polymer is chlorobutyl rubber, the first stage reaction between the amino grouping and the alkyl chloride of the chlorinated butyl is believed to proceed by N-alkylation or the formation of a quaternary ammonium salt, as set out in the following reaction schemes:

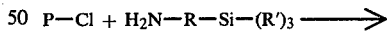

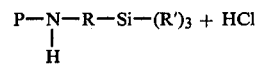

or

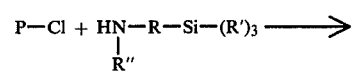

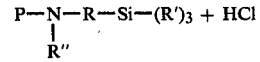

or

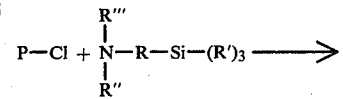

-continued

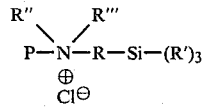

In the above, P represents a polymer; R represents a divalent radical such as an alkylene group eg propylene; R" and R'", which may be the same or different, represents a monovalent radical such as an alkyl group e.g. methyl or ethyl; and the silicon substituents R' may independently be hydrogen or a hydrolyzable radical with the proviso that at least one R' must be hydrolyzable. By way of example the hydrolyzable radical may be acetoxy, halogen, or alkoxy having from 1 to 20, preferably 1 to 10 and most preferably 1 to 3 carbon atoms. Amino trialkoxy silanes of the formula $NH_2(CH_2)_n Si(ORiv)_3$ where Riv is alkyl and n is a number from 1 to 8 have been found to be particularly useful as reactive silanes in the process of the invention, especially when the rubbery polymer is chlorobutyl rubber.

A particularly preferred embodiment of the invention therefore provides a process for producing a composition having improved adhesion to mineral substrates characterized in that in a first stage a chlorobutyl rubber is mixed with an aminosilane having at least one hydrolyzable radical attached to the silicon atom; in a second stage the product of the first stage is mixed with an epoxy resin; and in a third stage epoxy containing product of the second stage is mixed with a further amount of an aminosilane having at least one hydrolyzable radical attached to the silicon atom, to form the desired composition.

Generally with respect to the silane, the primary amine is preferred. Also, as stated previously, at least one of the groups on the silane atom should be readily hydrolyzable, but it is preferred that three of these be hydrolyzable. The amounts of functional silane to be used will vary to some extent depending on the degree of hydrolyzable silane functionality required to produce a vulcanized network.

The reactive silane e.g. amino silane is reacted with the rubbery polymer eg chlorobutyl rubber during the normal compounding conditions for the rubber; for example reaction may be achieved by incorporating the silane into the compounding, at elevated temperatures of from 135° to 150° C., say at 140° C. for about half an hour.

Any epoxy resin may be used in the second stage of the process. It is preferred however to use epoxy compounds derived from bisphenols and epichlorhydrin, those sold under the Registered Trade Mark "Epikote", e.g. Epikote 1007, being particularly preferred. The epoxy resin may conveniently be mixed with the silane treated rubber with heating, again preferably at temperatures in the range 135° to 150° C.

The epoxy resin serves as a wetting agent with regard to the rubbery polymer, and so to an extent the amount incorporated is arbitrary. However it has been found that added amounts of 10 to 50 wt %, particularly 25 wt %, based on the weight of rubbery polymer are effective.

The second charge of silane may then be reacted with the epoxy treated material in the third process stage, if required under similar conditions to those used for the first process stage. The amount of silane used is preferably at least that stoichiometrically required to combine with the epoxy groups present. The use of an excess amount of silane is even preferred since this will enhance the formation of chemical bonding between the rubber and the substrate.

We have found that the compositions produced according to the present invention have significantly improved adhesion to mineral substrates, particularly when the modified rubber is chlorobutyl rubber, compared with unmodified butyl rubbers. On contact between the substrate and the composition, the alkoxy groups or other hydrolyzable groups present in the silane attached to the polymer chains will be hydrolyzed by traces of water on the mineral substrate surface to give a strong bond thereto. Frequently in the use of such compositions there will be sufficient water present to give a strong bond but if necessary the surface may be deliberately wetted. It is believed that through the effect of moisture the alkoxysilane or other hydrolyzable groups form silanols which can react both among themselves (thus crosslinking the rubbery polymer and the epoxy resin) and with e.g. OH groups on the glass surface. The adhesion can be developed under normal atmospheric conditions or at elevated temperatures or by immersing the surfaces to be bonded in hot water. The compositions are particularly useful in bonding glass, especially as sealants for double glazing. It is believed that the presence of the epoxy resin improves the extent to which the glass is wetted by the rubber, and that the process technique gives improved internal bonding and adhesion. It has also been found that the compositions such as are exemplified hereinafter undergo crosslinking with time at room temperature. Thus once applied the composition will provide increasingly cohesive strength.

The compositions, especially modified chlorobutyl rubbers produced by the process of the present invention are particularly useful as sealants for double glazing between the glass and the metal, generally aluminium, spacer. The compositions will generally be used as a component in a hot flow mastic which may contain other conventional components such as polyisobutylene and petroleum resin tackifiers; fillers such as carbon black and whiting; and other additives such as stabilisers, antioxidants and pigments. Thus in one embodiment the process of the invention includes incorporating a filler or other conventional addition at any stage. By way of example the final composition may have the overall ingredients, based on the composition or as whole, of 7.5–12.5% rubbery polymer; 2–5% epoxy resin; 0.5–1.5% silane: 15–20% polyisobutylene; 10–15% carbon black; 25–30% whiting; 25–30% plasticiser/tackifier. The handling and service properties (temperature and viscosities) of such compositions may be adjusted by controlling the ratio of rubbery polymer and additive e.g. polyisobutylene, or by controlling the molecular weight of the polyisobutylene.

The mastic may then be extruded at elevated temperatures between the surfaces to be adhered. The temperatures vary, depending on the viscosity of the mastic composition and may be in the range 150°–180° C. Alternatively the composition may be in the form of a tape.

The following Examples illustrate, but in no way limit, the invention.

EXAMPLE 1

A rubber composition in the form of a mastic was prepared by mixing the components in the manner described below, the composition having the ingredients in the proportions (parts by weight) indicated in Table 1 in which:- Chlorobutyl 1068 is a chlorobutyl rubber; Vistanex MML-140 is a polyisobutylene of molecular weight 1900 000–2350 000; Vistanex LM-MS is a polyisobutylene (molecular weight about 55000); silane Z-6020 is commercially available N-beta-(aminoethyl) gamma-amino propyl trimethoxy silane; Epikote 1007 is a solid bisphenol A-epichlorohydrin epoxide resin; Omya BL is a whiting; Escorez 1304 is a petroleum resin tackifier; and FEF is a carbon black.

Thus 40 parts of chlorobutyl rubber and 20 parts of carbon black were mixed in a Banbury internal mixer at 140° C. to make a masterbatch. Half of this masterbatch was placed in a kneader mixer at 110° C. with 30 parts polyisobutylene and 15 parts carbon black and after 15 minutes mixing the remainder of the masterbatch, the remainder of the polyisobutylene and the remainder of the carbon black were added. After a further 15 minutes mixing 33.33 parts tackifier and 50 parts whiting were added and mixing was continued for another 15 minute period. Thereafter the remainder of the tackifier and whiting was added and the temperature was increased with mixing over 30 minutes to 135°–140° C. At this point 2 parts of silane were added and reacted with the chlorobutyl for 30 minutes with mixing. Subsequently the epoxy resin was added and mixed for 15 minutes at 145°–150° C., and thereafter the remaining 1.5 parts of silane were added and reacted with the epoxy for 30 minutes prior to dumping the composition from the kneader.

The mastic composition was tested using a sandwich technique. Thus two aluminium spacers (wrapped with release paper) were sandwiched between two glass plates which had been cleaned and dried with acetone, and the cavity was filled to a contact area of 25×50×7.5 mm with the mastic delivered from a hot gun having a body temperature of about 180° C. The set was then tested by pulling at 5 cm/min in shear; the Mooney viscosity was also measured. These measurements, which were made on the fresh composition and on composition which had been aged for one year, are given in Table 2. Adhesion values marked * were interfacial values, the other values reflect cohesive failure.

EXAMPLES 2 AND 3, AND COMPARISON EXAMPLE 4

Example 1 was substantially repeated but using ingredients such that the overall compositions produced had the formulation shown in Table 1.

TABLE I

| Example | 1 | 2 | 3 | 4 |
| --- | --- | --- | --- | --- |
| Chlorobutyl 1068 | 40 | 30 | 40 | 40 |
| Vistanex LM-MS | 60 | 70 | 30 | 60 |
| Vistanex MML-140 | — | — | 30 | — |
| FEF | 50 | 50 | 50 | 50 |
| Omya BL | 100 | 100 | 100 | 100 |
| Escorez 1304 | 100 | 100 | 100 | 100 |
| Silane Z-6020 | 2 + 1.5 | 1.5 + 1.5 | 2 + 1.5 | 2 |
| Epikote 1007 | 10 | 10 | 10 | — |

TABLE 2

| | Example | | | | |
| --- | --- | --- | --- | --- | --- |
| | 1 | 1 | 2 | 3 | 4 |
| Temperature | Unaged | Aged | Unaged | Unaged | Unaged |
| | Adhesion (kg) | | | | |
| Ambient | 34 | 41 | 26 | 32* | 24 |
| 65° C. | 3.1 | — | — | — | — |
| 80° C. | — | 2.2* | 1.0 | 2.3* | 1.7 |
| | Mooney Viscosity ML (1 + 14) | | | | |
| 50° C. | 69 | 89 | 67 | 75 | 63 |
| 70° C. | 28 | 34 | 19 | 32 | 21 |
| 90° C. | 15 | 18 | 8 | 18 | 10 |
| 110° C. | 8 | 10 | 5 | 13 | 6 |

As may be concluded from the above results, the presence of the epoxy resin in the formulation improves the adhesion and has a low effect on cohesion. Moreover the viscosity and cohesion of the mastic composition decrease as the ratio of chlorobutyl to polyisobutylene is decreased (a decrease in hot viscosity being a means of improving the contact surface and hence adhesion). Furthermore it may be deduced that increasing the molecular weight of the polyisobutylene which is admixed with the composition produced according to the invention leads to an increase in the hot cohesion.

We claim:

1. A process for producing a composition having improved adhesion to mineral substrates which comprises in a first stage reacting a rubbery polymer with a reactive silane at elevated temperature; in a second stage mixing the product of the first stage with an epoxy resin as wetting agent; and in a third stage reacting the epoxy containing product of the second stage with a further amount of a reactive silane to form the desired composition wherein said rubbery polymer is selected from the group consisting of halobutyl rubber, ethylene propylene rubber (EPR), ethylene propylene diene rubber (EPDM), and ethylene vinyl acetate copolymer (EVA), wherein said reactive silanes have a first group attached directly or indirectly to the silicon atom which is reactable with the rubbery polymer, and at least one other group attached directly or indirectly to the silicon atom which is hydrolysable, said reactive silanes in the first and third stages being the same or different.

2. A process according to claim 1 wherein the halobutyl rubber is a chlorobutyl rubber.

3. A process according to claim 1 wherein the reactive silane used in the first stage is the same as that used in the third stage.

4. A process according to claim 1 wherein the reactive silane is an aminosilane.

5. A process according to claim 1 wherein the reactive silane is selected from the group consisting of mercapto-, epoxy- and vinyl silanes.

6. A process according to claim 1 wherein in the first stage an amount of reactive silane is used corresponding to from 50 to 100% of that stoichiometrically required to combine with the rubbery polymer.

7. A process according to claim 6 wherein the amount of reactive silane used in the first stage corresponds to from 60 to 75% of that stoichiometrically required to combine with the rubbery polymer.

8. A process according to claim 1 wherein in the third stage an amount of reactive silane is used corresponding to at least that stoichiometrically required to combine with the epoxy groups present.

9. A process according to claim 1 wherein an additive selected from fillers, pigments and processing aids is incorporated at any stage.

10. A process for producing a composition having improved adhesion to mineral substrates which comprises in a first stage mixing a chlorobutyl rubber with an aminosilane having at least one hydrolyzable radical attached to the silicon atom; in a second stage mixing the product of the first stage with an epoxy resin; and in a third stage mixing the epoxy containing product of the second stage with a further amount of an aminosilane having at least one hydrolyzable radical attached to the silicon atom, to form the desired composition.

11. The use of a composition produced in accordance with the process of claim 1 as a mastic.

12. A glazing system which includes, as sealant, a composition produced in accordance with the process of claim 1.

* * * * *